US009622423B1

(12) United States Patent
Rexford et al.

(10) Patent No.: US 9,622,423 B1
(45) Date of Patent: Apr. 18, 2017

(54) BALLOON AND FLORAL CENTERPIECE KIT (71) Applicants: Guy Rexford, Orlando, FL (US); Randall Jones, Orlando, FL (US)

(72) Inventors: Guy Rexford, Orlando, FL (US); Randall Jones, Orlando, FL (US)

( * ) Notice: Subject to any disclaimer, the term of this patent is extended or adjusted under 35 U.S.C. 154(b) by 0 days.

(21) Appl. No.: 15/170,061

(22) Filed: Jun. 1, 2016

(51) Int. Cl.
*A63H 27/10* (2006.01)
*A01G 5/04* (2006.01)

(52) U.S. Cl.
CPC .............. *A01G 5/04* (2013.01); *A63H 27/10* (2013.01); *A63H 2027/1008* (2013.01)

(58) Field of Classification Search
CPC .................... A63H 27/10; A63H 2027/1008
See application file for complete search history.

(56) References Cited

U.S. PATENT DOCUMENTS

| 4,944,709 | A | * | 7/1990 | Lovik | A63H 27/10 446/221 |
| 4,953,713 | A | * | 9/1990 | Yaffe | A47F 5/04 206/460 |
| 5,024,011 | A | * | 6/1991 | Collins | A63F 9/00 211/13.1 |
| 5,336,066 | A | * | 8/1994 | Myers | F04B 39/0016 417/234 |
| 8,444,098 | B2 | * | 5/2013 | Parello | A63H 27/10 24/30.5 R |
| 9,192,870 | B2 | * | 11/2015 | Chapman-Rickman | A63H 27/10 |
| 2007/0049158 | A1 | * | 3/2007 | Chou | A63H 27/10 446/220 |

* cited by examiner

*Primary Examiner* — John Ricci
(74) *Attorney, Agent, or Firm* — Jason T. Daniel, Esq.; Daniel Law Offices, P.A.

(57) ABSTRACT

A balloon and floral centerpiece kit includes a plurality of interlocking extension members that secure together to form any number of different shapes. A base unit is removably secured to the bottommost extension member. The base unit including a main body, a lid and a shaft connection member. A topper is removably secured to the top end of the uppermost extension member. A plurality of balloons are removably secured along one or more of the plurality of interlocking extension members, the base unit and the topper. The kit also includes a plurality of generally T-shaped spikes, various decorative elements, a balloon pump, and assembly instructions.

15 Claims, 8 Drawing Sheets

BALLOON AND FLORAL CENTERPIECE KIT

TECHNICAL FIELD

The present invention relates generally to decorative arrangements, and more particularly to a balloon and floral centerpiece kit.

BACKGROUND

The statements in this section merely provide background information related to the present disclosure and may not constitute prior art.

Decorative tabletop centerpieces such as floral bouquets and/or balloon arrangements are a popular way to celebrate holidays and special occasions such as birthdays, weddings and/or anniversaries, for example. Although individual flowers and balloons can be bought at virtually any grocery store in America, most consumers are unable to recreate the artistry that comes from a professionally designed and constructed centerpiece.

For this reason, consumers must currently engage a local florist or balloon decorating company to create a custom centerpiece to suit a particular occasion. Although this process undoubtedly produces a stunning display, it also represents a somewhat costly investment, as the supplier of the centerpiece must be compensated for the custom work. Moreover, owing to the delicate nature of the assembled product, it is extremely difficult and expensive to ship such arrangements without causing damage to the same.

Accordingly, it would be beneficial to provide a kit which can be shipped to a consumer that includes all of the necessary components and instructions for allowing the consumer to create a professionally designed tabletop centerpiece for displaying balloon and/or floral arrangements, thereby alleviating the drawbacks described above.

SUMMARY OF THE INVENTION

The present invention is directed to a balloon and floral centerpiece kit. One embodiment of the present invention can include a plurality of interlocking extension members which can be secured together to form any number of different shapes. The invention can also include a base unit which can be secured to the bottommost extension member. The base unit can function to allow the assembled centerpiece to stand on its own. A topper can also be secured to the uppermost extension member and can have a function-specific upper end. The kit can also include a plurality of balloons for securement onto one or more of the plurality of interlocking extension members, the base unit and the topper.

In another embodiment, the plurality of interlocking extension members can include various lengths and shapes. Each of the extension members can also include a plurality of apertures which can receive a plurality of generally T-shaped spikes. The spikes can function to puncture a non-inflated portion of a balloon for securement onto the extension member. In yet another embodiment, the kit can also include various decorative elements, a balloon pump, assembly instructions, and/or flowers.

This summary is provided merely to introduce certain concepts and not to identify key or essential features of the claimed subject matter.

BRIEF DESCRIPTION OF THE DRAWINGS

Presently preferred embodiments are shown in the drawings. It should be appreciated, however, that the invention is not limited to the precise arrangements and instrumentalities shown.

DETAILED DESCRIPTION OF THE INVENTION

While the specification concludes with claims defining the features of the invention that are regarded as novel, it is believed that the invention will be better understood from a consideration of the description in conjunction with the drawings. As required, detailed embodiments of the present invention are disclosed herein; however, it is to be understood that the disclosed embodiments are merely exemplary of the invention which can be embodied in various forms. Therefore, specific structural and functional details disclosed herein are not to be interpreted as limiting, but merely as a basis for the claims and as a representative basis for teaching one skilled in the art to variously employ the inventive arrangements in virtually any appropriately detailed structure. Further, the terms and phrases used herein are not intended to be limiting but rather to provide an understandable description of the invention.

FIGS. 1-7 illustrate various embodiments of a centerpiece kit for displaying balloon and/or floral arrangements that is useful for understanding the inventive concepts disclosed herein. Identical reference numerals are used for like elements of the invention or elements of like function. For the sake of clarity, only those reference numerals are shown in the individual figures which are necessary for the description of the respective figure. For purposes of this description, the terms "upper," "bottom," "right," "left," "front," "vertical," "horizontal," and derivatives thereof shall relate to the invention as oriented in FIG. 1.

Figure 1:
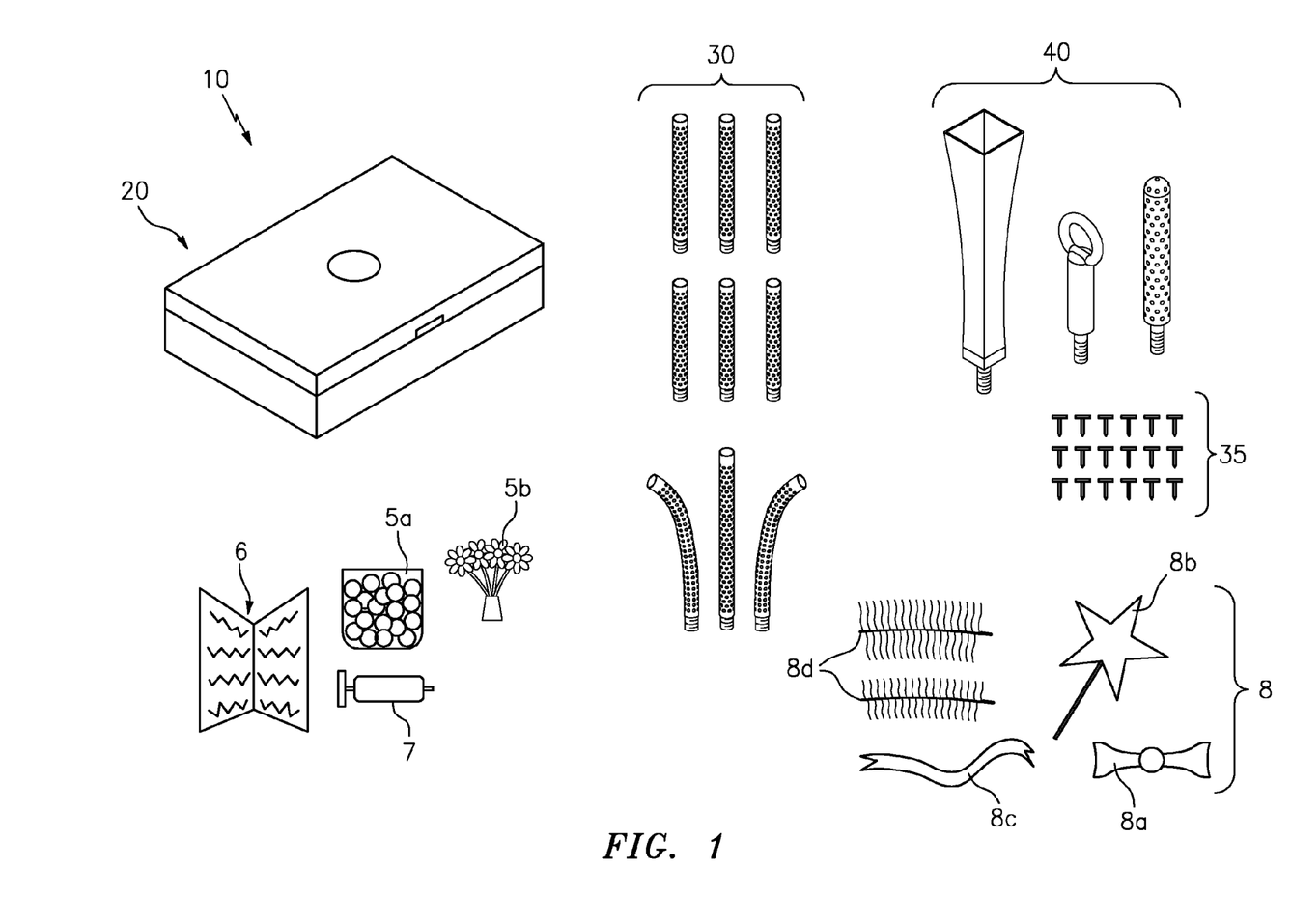
FIG. 1 is a perspective view of a balloon and floral centerpiece kit in a disassembled configuration that is useful for understanding the inventive concepts disclosed herein.

FIG. 1 is an exploded parts view of the balloon and floral centerpiece kit 10. As shown, the kit can include a base unit 20, a plurality of interlocking extension members 30, and/or one or more toppers 40. In various embodiments, the kit will also include a plurality of balloons 5a and/or flowers 5b, assembly instructions 6, an optional balloon pump 7, and/or various decorative elements 8 such as decorative bows 8a, signs 8b, streamers 8c, feathers and/or garland wrapped wire 8d, for example. Of course, any number of different decorative elements can also be provided with the kit.

Figure 2A:
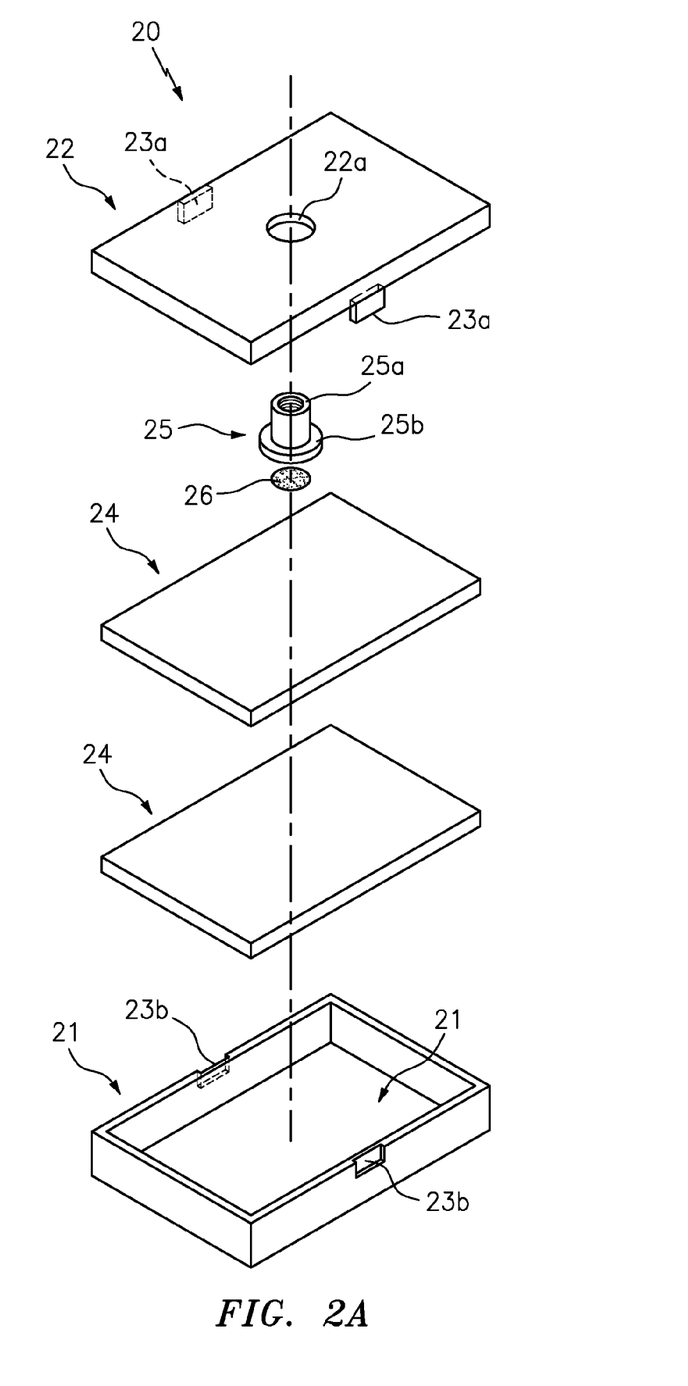
FIG. 2A is an exploded parts view of the base unit of the balloon and floral centerpiece kit, in accordance with one embodiment of the invention.
Figure 2B:
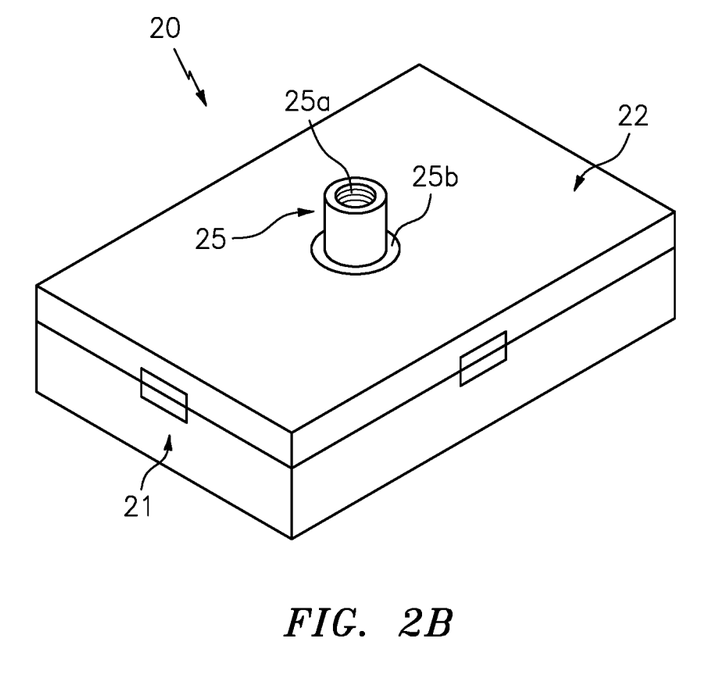
FIG. 2B is a perspective view of the base unit of the balloon and floral centerpiece kit, in accordance with one embodiment of the invention.

As shown in FIG. 2, the base unit 20 can include a generally box-like main body 21 having a flat bottom and a plurality of sides that form an interior space 21a. A substantially identically shaped lid 22 having a centrally located aperture 22a can be removably secured to the top of the main body via a plurality of compression tabs 23a that are sized and shaped to engage complementary notches 23b disposed along the main body.

The main body and lid can preferably be constructed from durable and lightweight materials such as plastic, for example, however any number of other construction materials are also contemplated. In either instance, the main body and lid can each include any number of different shapes, sizes and/or indicia to suit a particular theme or event.

As described herein, the term "indicia" can include any type of decorative elements such as colors, markings, words, symbols, logos, designs, lights, types of materials, texturing of materials, patterns, images, drawings, photographs and/or jewels, for example. The indicia can be secured onto and/or into the base unit in accordance with known techniques so as to be flush with the surface or raised/protruding outward therefrom so as to give a three dimensional effect.

One or more weighted elements 24 can be secured within the interior space 21a of the main body, and can function to prevent the assembled centerpiece from tipping or falling. To this end, the exact weight of each centerpiece may vary depending on the ultimate shape and number of components. In one embodiment, the weighted elements can include commercially available floor tiles, having a known weight and flat upper surface that allows the same to be stackable within the main body. Of course, the weighted elements 24 are not limited to tiles, as virtually any object having a shape that can fit within the interior space, and a weight that is suitable for preventing the device from tipping over can also be utilized.

A shaft connection member 25 can be positioned within the interior space 21a, at a location directly beneath the central aperture 22a. As shown, the connection member 25 can include a threaded aperture 25a along the upper end thereof. The threaded aperture includes a shape and size that is suitable for receiving one end of the below described interlocking extension members 30 via a twisting motion. An adhesive 26 or other such bonding agent can be positioned along the bottom end 25b of the shaft connection member, so as to secure the same onto the uppermost weighted element 24 in a peel-and-stick manner. Of course, any number of other devices capable of mating the connection member to the weighted element can also be utilized.

Although described above as including particular shapes, sizes and/or construction materials, this is for illustrative purposes only, as many other embodiments are also contemplated. To this end, FIG. 2A illustrates one embodiment wherein the interior space of the main body is waterproof, so as to allow an end user to utilize water as the weighted element. Moreover, the above described shaft connection member 25 can be secured to, or embedded within the lid 22 so as to form a unitary element that serves the functionality of both components, as described above.

Figure 3:
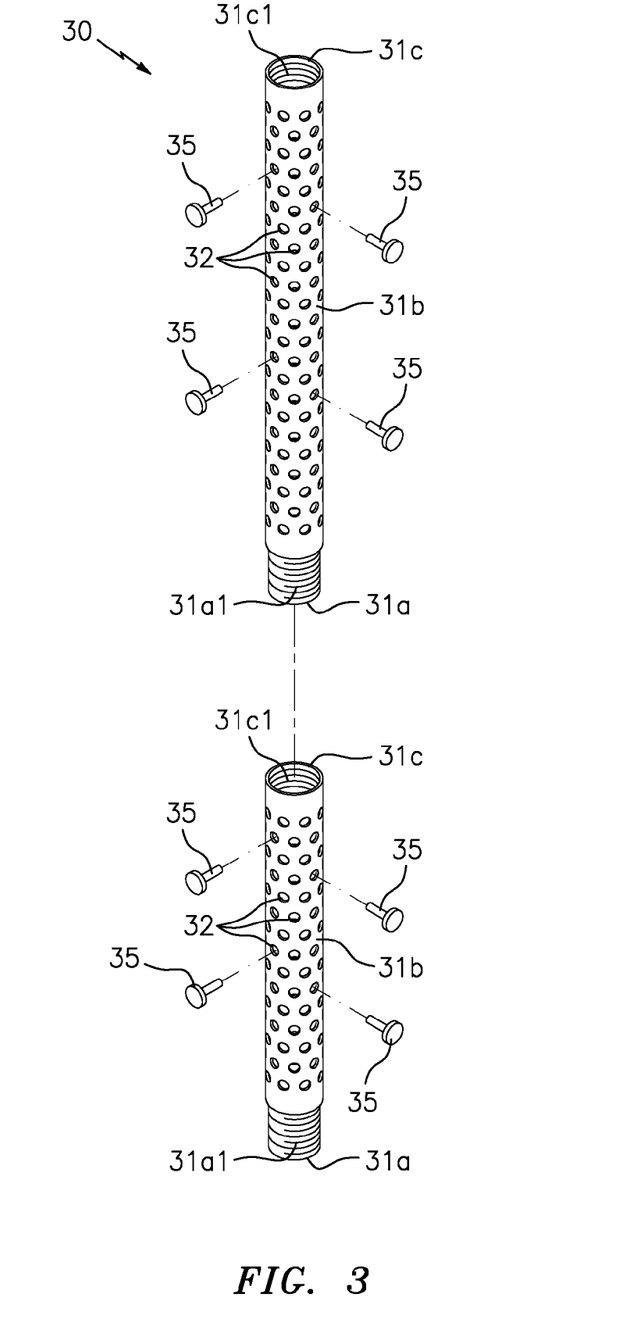
FIG. 3 is a side view of a pair of the interlocking extension members of the balloon and floral centerpiece kit, in accordance with one embodiment of the invention.

As shown in FIG. 3, each of the extension members 30 can include an elongated, generally tubular-shaped body having a first end 31a, a middle section 31b and an aperture 31c along the second end. Each of the extension members can also include a plurality of small apertures 32 that are disposed along an entirety thereof. Such apertures can function to receive any number of generally T-shaped spikes 35 onto which balloons can be secured. In various embodiments, once a balloon has been inflated with air and sealed with a knot, the remaining material on the non-inflated side of the knot can be punctured by the end of the T-shaped spike before that same end is positioned into one of the apertures. Such a feature allows precise and secure placement of the balloon along each extension member.

In another embodiment, one or more of the T-shaped spikes can further include an adhesive material that is disposed along one end thereof. The adhesive can function to allow a user to adhere the T-shaped member onto any portion of the device without utilizing the aperture(s) 32.

In the preferred embodiment, a plurality of threaded elements 31a1 can be disposed along the outer periphery of the first end 31a, and another plurality of threaded elements 31c1 can be located within the aperture 31c of the second end. In this regard, the first end of each extension member can be inserted within the aperture of the second end of another extension member and can be secured in place via a twisting motion. Such a feature ensures that the resulting assembled centerpiece maintains its shape and is not easily deformed. Threaded elements having lands and grooves for securing complementary objects together via a twisting motion are extremely well known.

As described herein, each of the extension members can include any number of different lengths, shapes and sizes, and can preferably be constructed from a lightweight material such as PVC, for example. Of course, any number of other construction materials are also contemplated. Moreover, in various embodiments, one or more of the extension members can be hollow and generally transparent in nature, and can function to store secondary objects such as candy, for example.

Although described above as utilizing threaded elements for securing components together via a rotational force, the inventive concepts disclosed herein are not limited to the use of such elements. As such, each of the components can be manufactured so as to be secured together without utilizing threaded elements, and/or can be secured together utilizing any number of common connectors that are capable of joining two objects together in either a permanent or non-permanent manner. Several nonlimiting examples include, opposing strips of hook and loop material (i.e. Velcro®), magnetic elements and compression fittings such as snaps and buttons.

Figure 4A:
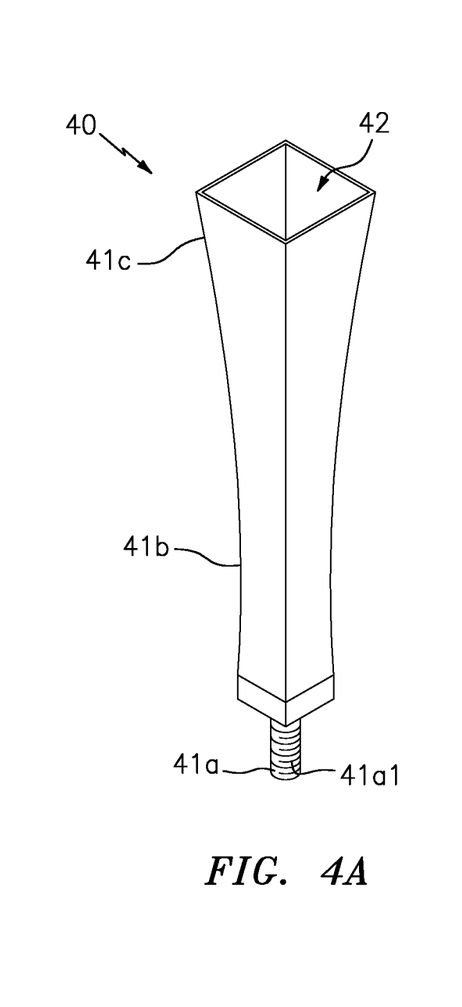
FIG. 4A is a side view of one embodiment of a topper for the balloon and floral centerpiece kit, in accordance with one embodiment of the invention.
Figure 4B:
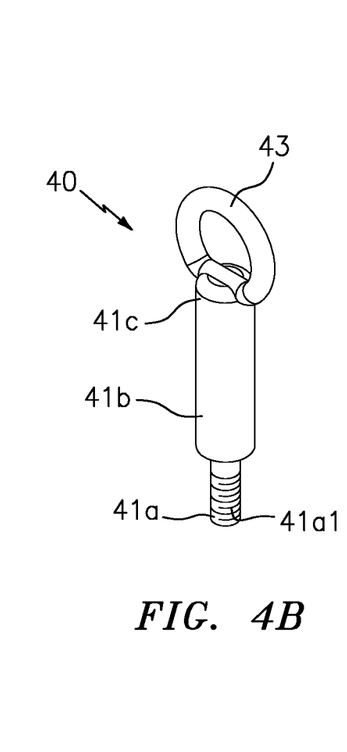
FIG. 4B is a side view of another embodiment of a topper for the balloon and floral centerpiece kit, in accordance with one embodiment of the invention.
Figure 4C:
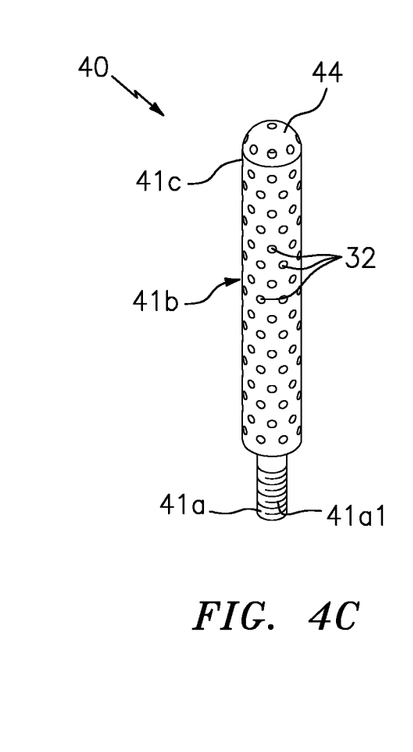
FIG. 4C is a side view of another embodiment of a topper for the balloon and floral centerpiece kit, in accordance with one embodiment of the invention.

FIGS. 4A, 4B and 4C illustrate various embodiments of a topper 40 for use with the extension members 30. As shown, each of the toppers 40 can include a main body having a bottom end 41a, a middle portion 41b and a top end 41c. In the preferred embodiment, the bottom end of each topper can include a plurality of threaded elements 41a1 disposed thereon, so as to allow the bottom end of each topper to be inserted within the threaded aperture of an extension member, as described above. The top end of each topper can include an unlimited number of different designs, shapes and/or components.

To this end, various embodiments of the topper can include an opening 42 forming a vase for receiving objects such as candy 2, for example. In another embodiment, the topper can include a ring 43 along the top end. The ring can function to allow any number of decorative elements to be tied thereon. Yet another embodiment of the topper can include a capped top end 44, and a plurality of the above described apertures 32 for receiving the T-shaped spikes.

Of course, the topper 40 is not limited to the illustrated design, as any number of other embodiments are contemplated having any number of different shapes, sizes and/or components secured along the top end thereof.

Figure 5:
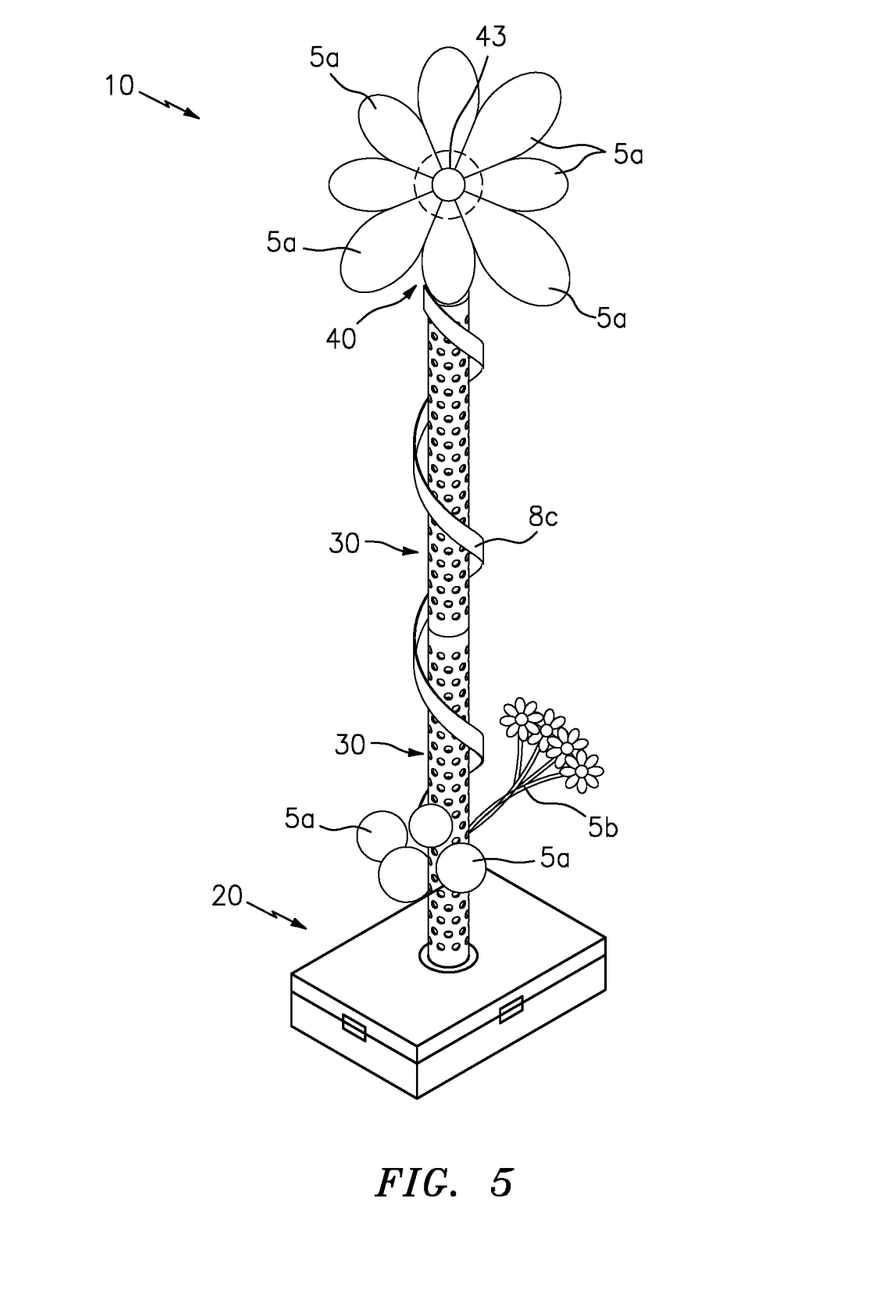
FIG. 5 is a perspective view of an assembled balloon and floral centerpiece kit, in accordance with one embodiment of the invention.
Figure 6:
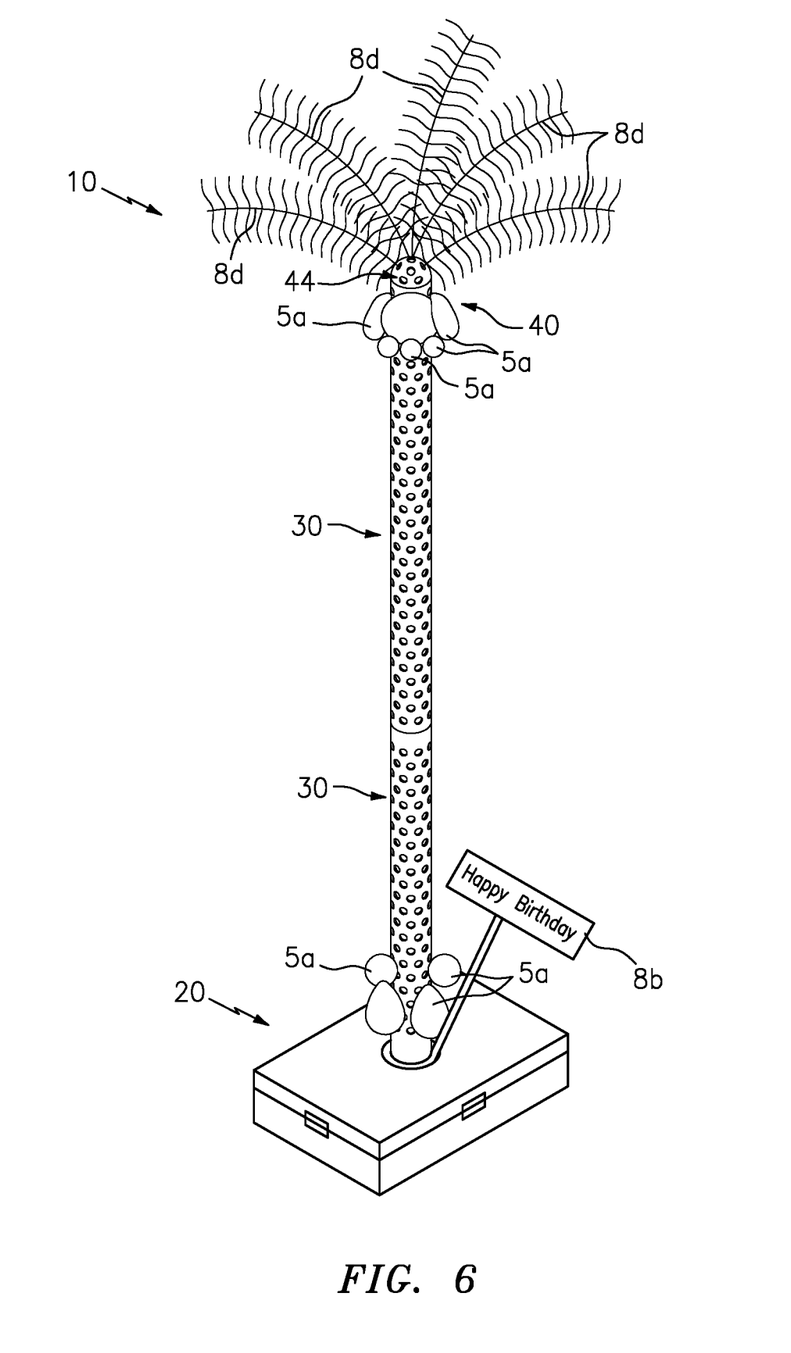
FIG. 6 is another perspective view of an assembled balloon and floral centerpiece kit, in accordance with one embodiment of the invention.
Figure 7:
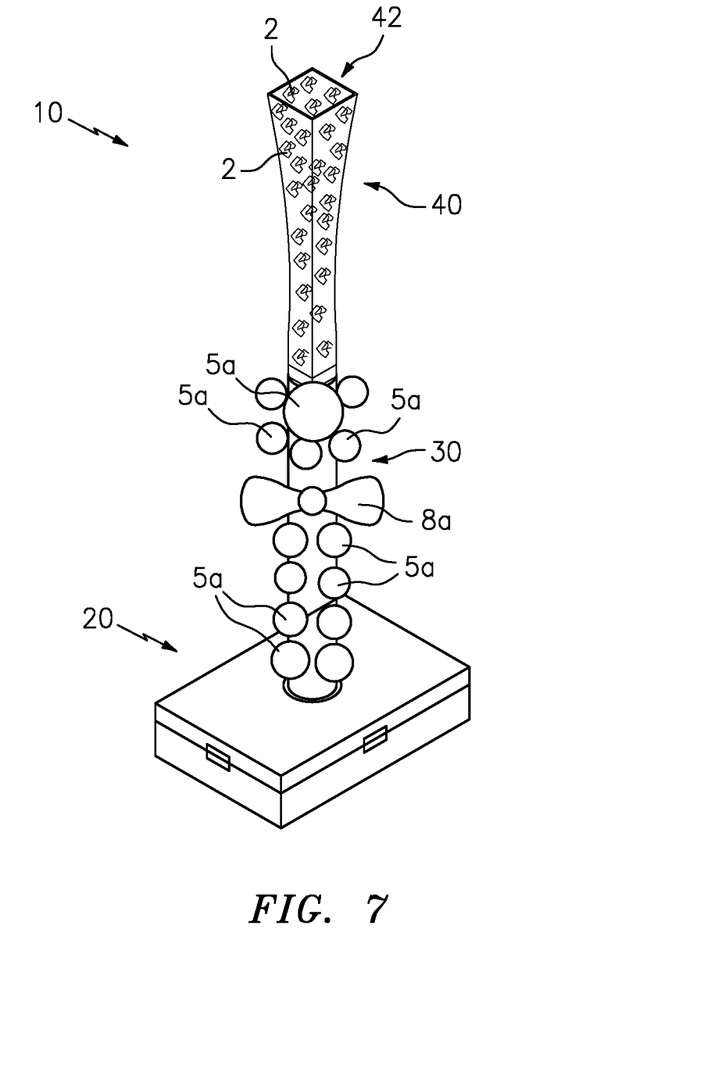
FIG. 7 is yet another perspective view of an assembled balloon and floral centerpiece kit, in accordance with one embodiment of the invention.

FIGS. 5-7 illustrate several nonlimiting examples of fully assembled centerpiece kits 10 which can be professionally designed to suit a variety of different occasions. Each of the illustrated examples can be shipped to a consumer in a disassembled configuration, and assembled by the end user with the aid of the instruction book 6. To this end, although illustrated with regard to three specific versions, those of skill in the art will recognize that any number of different shapes and designs can created utilizing the above described components, without undue experimentation, and without deviating from the inventive concepts disclosed herein.

As described herein, one or more elements of the collapsible centerpiece kit 10 can be secured together utilizing any number of known attachment means such as, for example, screws, glue, compression fittings and welds, among others. Moreover, although the above embodiments have been described as including separate individual elements, the inventive concepts disclosed herein are not so limiting. To this end, one of skill in the art will recognize that one or more individually identified elements may be formed together as one or more continuous elements, either through manufacturing processes, such as welding, casting, or molding, or through the use of a singular piece of material milled or machined with the aforementioned components forming identifiable sections thereof.

As to a further description of the manner and use of the present invention, the same should be apparent from the above description. Accordingly, no further discussion relating to the manner of usage and operation will be provided.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A kit, comprising:
   a plurality of interlocking extension members, each of which including an elongated generally tubular shape having a first end, a second end, and a middle section;
   a base unit having a main body and a shaft connection member, said shaft connection member being configured to engage the first end of one of the interlocking extension members;
   a topper having a bottom end that is configured to engage the second end of one of the plurality of interlocking extension members, said topper further including a hollow middle section, and a top end having an opening that extends into the hollow middle section; and
   a plurality of balloons for securement onto one or more of the plurality of interlocking extension members, the base unit and the topper.

2. The kit of claim 1, further comprising:
   a plurality of small apertures that are positioned along each of the plurality of interlocking extension members; and
   a plurality of generally T-shaped spikes, each of the spikes including a first end that is configured to puncture a non-inflated portion of at least one of the plurality of balloons before engaging one of the small apertures.

3. The kit of claim 1, wherein the main body of the base unit includes a generally box-like shape having a flat bottom and a plurality of sides that form an internal space; and
   said shaft connection member being positioned within the internal space.

4. The kit of claim 3, further comprising:
   a lid that is removably secured to a top end of the base unit, said lid including a central aperture that is positioned above the shaft connection member for receiving the first end of the one of the interlocking extension members.

5. The kit of claim 4, wherein the main body is watertight and is configured to receive and store water therein.

6. The kit of claim 4, further comprising:
   one or more weighted elements that are disposed within the interior space.

7. The kit of claim 6, wherein the shaft connection member is secured to a top end of one of the one or more weighted elements.

8. The kit of claim 7, wherein at least one of the weighted elements includes a floor tile.

9. The kit of claim 1, wherein the topper further includes:
   a top end having a ring disposed thereon.

10. The kit of claim 1, wherein the topper further includes:
    an elongated middle section;
    a capped top end;
    a plurality of small apertures that are positioned along the elongated middle section and the capped top end; and
    a plurality of generally T-shaped spikes, each of the spikes including a first end that is configured to puncture a non-inflated portion of at least one of the plurality of balloons before engaging one of the small apertures.

11. The kit of claim 1, further comprising:
    assembly instructions;
    a balloon pump; and
    a plurality of decorative elements.

12. The kit of claim 1, wherein at least one of the plurality of interlocking extension members includes a length that is different from a length of another of the plurality of interlocking extension members.

13. The kit of claim 1, wherein at least one of the plurality of interlocking extension members includes a shape that is different from a shape of another of the plurality of interlocking extension members.

14. A kit, comprising:
- a plurality of interlocking extension members, each of which including an elongated generally tubular shape having a first end, a second end, and a middle section;
- a base unit having a main body and a shaft connection member, said shaft connection member being configured to engage the first end of one of the interlocking extension members;
- a topper having a bottom end that is configured to engage the second end of one of the plurality of interlocking extension members;
- a plurality of balloons for securement onto one or more of the plurality of interlocking extension members, the base unit and the topper,
- a plurality of small apertures that are positioned along each of the plurality of interlocking extension members; and
- a plurality of generally T-shaped spikes, each of the spikes including a first end that is configured to puncture a non-inflated portion of at least one of the plurality of balloons before engaging one of the small apertures.

15. A kit, comprising:
- a plurality of interlocking extension members, each of which including an elongated generally tubular shape having a first end, a second end, and a middle section;
- a base unit having a main body and a shaft connection member, said shaft connection member being configured to engage the first end of one of the interlocking extension members;
- a topper having a bottom end that is configured to engage the second end of one of the plurality of interlocking extension members, said topper further including
  - an elongated middle section,
  - a capped top end,
  - a plurality of small apertures that are positioned along the elongated middle section and the capped top end, and
  - a plurality of generally T-shaped spikes, each of the spikes including a first end that is configured to puncture a non-inflated portion of at least one of the plurality of balloons before engaging one of the small apertures; and
- a plurality of balloons for securement onto one or more of the plurality of interlocking extension members, the base unit and the topper.

\* \* \* \* \*